United States Patent
Hara

(10) Patent No.: US 10,589,821 B2
(45) Date of Patent: Mar. 17, 2020

(54) BICYCLE CHAIN DEVICE

(71) Applicant: Shimano Inc., Sakai, Osaka (JP)

(72) Inventor: Nobukatsu Hara, Sakai (JP)

(73) Assignee: SHIMANO INC., Osaka (JP)

( * ) Notice: Subject to any disclaimer, the term of this patent is extended or adjusted under 35 U.S.C. 154(b) by 249 days.

(21) Appl. No.: 15/619,548

(22) Filed: Jun. 12, 2017

(65) Prior Publication Data
US 2017/0274961 A1    Sep. 28, 2017

Related U.S. Application Data

(63) Continuation of application No. 15/055,644, filed on Feb. 29, 2016, now Pat. No. 9,714,067.

(51) Int. Cl.
*B62M 9/122* (2010.01)
*B62M 9/14* (2006.01)
*B62M 9/00* (2006.01)

(52) U.S. Cl.
CPC .............. *B62M 9/122* (2013.01); *B62M 9/14* (2013.01); *B62M 2009/007* (2013.01)

(58) Field of Classification Search
CPC .............................. B62M 25/08; B62M 9/122; B62M 2009/007; B62M 25/045; B62M 9/132
USPC ........................................................ 474/140
See application file for complete search history.

(56) References Cited

U.S. PATENT DOCUMENTS

| | | | | |
|---|---|---|---|---|
| 3,901,095 A | * | 8/1975 | Wechsler | B62M 9/1244 474/81 |
| 3,965,763 A | * | 6/1976 | Wechsler | B62M 9/1246 474/81 |
| 4,384,864 A | * | 5/1983 | Bonnard | B62M 9/1242 474/80 |
| 4,412,828 A | * | 11/1983 | Darby | B62M 9/12 474/78 |
| 4,619,631 A | * | 10/1986 | Darby | B62M 25/045 174/80 |
| 4,728,316 A | * | 3/1988 | Darby | B62M 25/045 474/80 |
| 4,854,924 A | * | 8/1989 | Nagano | B62J 13/00 474/140 |
| 5,244,439 A | * | 9/1993 | Rogus | F16H 7/1263 474/136 |
| 5,447,475 A | * | 9/1995 | Socard | B62M 25/045 474/69 |
| 5,460,576 A | * | 10/1995 | Barnett | B62J 13/00 474/144 |
| 5,571,056 A | * | 11/1996 | Gilbert | B62M 9/128 280/238 |

(Continued)

FOREIGN PATENT DOCUMENTS

FR          2881199 A1     7/2006
TW       201441097 A     11/2014

*Primary Examiner* — Henry Y Liu

(57) ABSTRACT

A bicycle chain device that includes a mounting bracket configured to be affixed to a bicycle. The bicycle has a solitary bicycle front sprocket. A cage is movably mounted to the mounting bracket so that the cage is positioned adjacent to the front sprocket. The cage has a chain-receiving slot, through which a bicycle chain passes. The cage is configured to move in accordance with a shifting operation of a bicycle rear derailleur to maintain alignment with a chain to prevent the chain from falling off the sprocket.

16 Claims, 11 Drawing Sheets

(56) References Cited

U.S. PATENT DOCUMENTS

| | | | | |
|---|---|---|---|---|
| 5,649,877 A * | 7/1997 | Patterson | B62M 9/134 | 474/80 |
| 5,653,649 A * | 8/1997 | Watarai | B62M 9/122 | 474/78 |
| 5,658,001 A * | 8/1997 | Blanchard | B62K 25/26 | 280/275 |
| 5,725,450 A * | 3/1998 | Huskey | B62M 9/06 | 474/116 |
| 5,803,848 A * | 9/1998 | Nier | B62M 25/045 | 474/81 |
| 5,865,062 A * | 2/1999 | Lahat | B62M 25/045 | 474/81 |
| 6,007,441 A | 12/1999 | Tysver | | |
| 6,165,092 A * | 12/2000 | Bramham | B62M 9/16 | 474/134 |
| 6,173,982 B1 * | 1/2001 | Westergard | B62M 9/085 | 280/261 |
| 6,354,973 B1 * | 3/2002 | Barnett | B62J 13/00 | 474/101 |
| 6,533,690 B2 * | 3/2003 | Barnett | B62J 13/00 | 474/116 |
| 6,569,045 B1 | 5/2003 | Campagnolo | | |
| 6,726,586 B2 * | 4/2004 | Fukuda | B62M 9/122 | 474/70 |
| 6,899,649 B2 * | 5/2005 | Ichida | B62M 25/02 | 474/70 |
| 7,011,590 B2 * | 3/2006 | Ichida | B62M 25/02 | 474/70 |
| 7,153,229 B2 * | 12/2006 | Matsumoto | B62M 9/126 | 474/144 |
| 7,285,064 B2 | 10/2007 | Ichida | | |
| 7,306,531 B2 * | 12/2007 | Ichida | B62M 9/122 | 474/70 |
| 7,373,232 B2 | 5/2008 | Guderzo | | |
| 7,381,143 B2 * | 6/2008 | Matsumoto | B62M 9/04 | 474/78 |
| 7,547,263 B2 * | 6/2009 | Fukuda | B62M 25/08 | 280/260 |
| 7,553,247 B2 * | 6/2009 | Guderzo | B62J 99/00 | 280/260 |
| 7,708,295 B2 * | 5/2010 | Wesling | B62K 19/34 | 280/260 |
| 7,798,929 B2 * | 9/2010 | Takamoto | B62M 25/08 | 474/80 |
| 8,025,597 B2 * | 9/2011 | Takamoto | B62M 25/08 | 474/70 |
| 8,235,849 B2 * | 8/2012 | Cranston | B62J 13/00 | 280/261 |
| 8,371,974 B2 * | 2/2013 | Morita | B62M 9/16 | 280/261 |
| 8,491,428 B2 * | 7/2013 | Emura | B62M 9/136 | 474/3 |
| 8,550,942 B2 * | 10/2013 | Oda | B62K 23/06 | 474/80 |
| 8,777,788 B2 * | 7/2014 | Kawakami | B62M 9/1344 | 474/80 |
| 8,961,342 B2 * | 2/2015 | Emura | B62M 9/136 | 474/140 |
| 8,965,610 B2 * | 2/2015 | Boyle | B62M 6/50 | 180/206.1 |
| 8,968,129 B2 * | 3/2015 | Emura | B62M 9/16 | 474/111 |
| 8,998,756 B2 * | 4/2015 | Ichida | B62K 23/06 | 474/70 |
| 9,008,923 B2 * | 4/2015 | Takamoto | B62M 25/00 | 701/51 |
| 9,037,368 B2 * | 5/2015 | Miglioranza | F16H 9/04 | 701/60 |
| 10,053,188 B2 * | 8/2018 | Staples | B62M 9/105 | |
| 2002/0160869 A1 * | 10/2002 | Barnett | B62J 13/00 | 474/144 |
| 2003/0064840 A1 * | 4/2003 | Kawakami | B62M 9/04 | 474/70 |
| 2004/0005948 A1 * | 1/2004 | Shahana | B62M 25/02 | 474/78 |
| 2004/0005950 A1 * | 1/2004 | Tetsuka | B62M 25/02 | 474/80 |
| 2004/0009835 A1 * | 1/2004 | Heim | B62M 9/138 | 474/78 |
| 2004/0043851 A1 * | 3/2004 | Takebayashi | B62M 9/132 | 474/70 |
| 2005/0043129 A1 * | 2/2005 | Guderzo | B62M 9/122 | 474/78 |
| 2005/0176538 A1 * | 8/2005 | Morita | B62M 9/16 | 474/136 |
| 2005/0187049 A1 * | 8/2005 | Guderzo | B62M 9/122 | 474/70 |
| 2005/0215367 A1 * | 9/2005 | Thomasberg | B62M 9/14 | 474/78 |
| 2005/0255950 A1 * | 11/2005 | Takebayashi | B62M 9/122 | 474/70 |
| 2006/0189423 A1 * | 8/2006 | Ichida | B62M 9/131 | 474/80 |
| 2006/0240919 A1 * | 10/2006 | Matsumoto | B62M 9/04 | 474/78 |
| 2007/0037645 A1 * | 2/2007 | Ishikawa | B62M 9/132 | 474/80 |
| 2007/0062323 A1 * | 3/2007 | Shahana | B62M 9/127 | 74/502.2 |
| 2007/0184925 A1 * | 8/2007 | Ichida | B62M 9/132 | 474/80 |
| 2007/0207885 A1 * | 9/2007 | Watarai | B62M 25/08 | 474/70 |
| 2007/0265121 A1 * | 11/2007 | Gross | B62J 13/00 | 474/144 |
| 2008/0032835 A1 * | 2/2008 | Reynolds | B62M 9/136 | 474/80 |
| 2008/0132364 A1 * | 6/2008 | Ichida | B62M 9/132 | 474/70 |
| 2009/0062049 A1 * | 3/2009 | Cranston | B62J 13/00 | 474/144 |
| 2011/0079982 A1 * | 4/2011 | Patterson | B62M 9/12 | 280/261 |
| 2011/0230287 A1 * | 9/2011 | Savola | B62M 9/136 | 474/80 |
| 2012/0214628 A1 * | 8/2012 | Johnson | B62K 23/06 | 474/80 |
| 2012/0258827 A1 * | 10/2012 | Ishikawa | B62M 9/1248 | 474/80 |
| 2013/0008282 A1 * | 1/2013 | Johnson | B62M 3/00 | 74/594.2 |
| 2013/0053196 A1 * | 2/2013 | Emura | B62M 9/136 | 474/140 |
| 2013/0217527 A1 * | 8/2013 | Graziosi | B62M 9/16 | 474/140 |
| 2014/0121047 A1 * | 5/2014 | Katsura | B62M 9/122 | 474/80 |
| 2014/0155206 A1 * | 6/2014 | Johnson | B62M 9/124 | 474/80 |
| 2014/0179470 A1 * | 6/2014 | Savard | B62M 9/1342 | 474/80 |
| 2014/0243128 A1 * | 8/2014 | Pasqua | B62M 9/134 | 474/80 |
| 2014/0274507 A1 * | 9/2014 | Wickliffe | B62M 9/134 | 474/80 |
| 2015/0274253 A1 * | 10/2015 | Hara | B62M 1/36 | 74/594.2 |
| 2017/0045121 A1 * | 2/2017 | Staples | B62M 9/105 | |
| 2018/0001961 A1 * | 1/2018 | Emura | F16H 7/20 | |

* cited by examiner

BICYCLE CHAIN DEVICE

BACKGROUND OF THE INVENTION

The invention generally relates to a bicycle chain device and, more particularly, to a chain device that follows movements of the chain path to remain generally aligned with the chain.

Chain devices are known for preventing a chain from falling off of a front sprocket of a bicycle. Typically chain devices are fixed. However, since the position of the chain changes depending on the position of the rear derailleur, the chain passage of fixed chain devices must be enlarged to accommodate such movement. This makes them less effective in maintaining the chain on the front sprocket.

SUMMARY OF THE INVENTION

In a first aspect, the invention is a bicycle chain device that includes a mounting bracket, which is configured to be affixed to a bicycle that has a solitary bicycle front sprocket having a rotational center axis, and a cage movably mounted to the mounting bracket so that the cage is positioned adjacent to the front sprocket. The cage has a chain-receiving slot, through which a bicycle chain passes. The chain device further includes an actuator, which is configured to move the cage in accordance with a shifting operation of a bicycle rear derailleur.

In a second aspect, in the bicycle chain device according to the first aspect, the actuator is configured to be operatively coupled to a mechanical operation cable that operates the bicycle rear derailleur.

In a third aspect, in the bicycle chain device according to the second aspect, the actuator includes a first actuating member configured to be coupled to the mechanical operation cable and a second actuating member operatively connected to the first actuating member and the cage, so that movement of the mechanical operation cable is transmitted to the second actuating member via the first actuating member to move the cage.

In a fourth aspect, in the bicycle chain device according to the third aspect, the first actuating member includes one of a rack and pinion and the second actuating member includes the other of the rack and pinion.

In a fifth aspect, in the bicycle chain device according to any of the second, third and fourth aspects, the cage is configured to be movable with respect to the mounting bracket between a retracted position and an extended position, and the cage is moved toward the retracted position as the mechanical operation cable is pulled toward an operating device that controls the mechanical operation cable.

In a sixth aspect, in the bicycle chain device according to any of the previous aspects, the actuator includes a linkage configured to be movably coupled to the cage so that the cage is movable with respect to the mounting bracket.

In a seventh aspect, in the bicycle chain device according to any of the previous aspects, the cage is configured to move in a direction extending along the rotational center axis of the front sprocket.

In an eighth aspect, in the bicycle chain device according to any of the previous aspects, the cage is pivotal about a pivot axis that is perpendicular to the rotational center axis of the front sprocket.

In a ninth aspect, in the bicycle chain device according to any of the previous aspects, the actuator includes an electrical motor to move the cage and a controller to move the electrical motor in accordance with an operation signal.

In a tenth aspect, in the bicycle chain device according to the ninth aspect, the operation signal is transmitted with a shifting signal to operate the bicycle rear derailleur.

In an eleventh aspect, in the bicycle chain device according to either of the ninth and tenth aspects, the controller moves the electrical motor such that the cage moves in a shifting direction of the rear derailleur operated by the shifting signal. The shifting direction extends along the rotational center axis of the front sprocket.

In a twelfth aspect, in the bicycle chain device according to any of the previous aspects, the actuator is configured to pivot the cage about a single pivot axis that is stationary with respect to the mounting bracket.

In a thirteenth aspect, in the bicycle chain device according to the twelfth aspect, the actuator is configured to pivot the cage about the single pivot axis so that a rear end of the cage moves in a shifting direction of the rear derailleur, which is operated by the shifting operation, wherein the shifting direction extends along the rotational center axis of the front sprocket.

In a fourteenth aspect, in the bicycle chain device according to any of the previous aspects, the cage has a first plate and a second plate forming the chain-receiving slot, and the cage is positioned such that bottom edges of the first and second plates at least partly overlap with the front sprocket as viewed in a direction parallel to the rotational center axis in a state in which the mounting bracket is affixed to the bicycle.

In a fifteenth aspect, the invention is a bicycle chain device that includes a mounting bracket, which is configured to be affixed to a bicycle that has a solitary bicycle front sprocket. The chain device further includes a cage movably mounted to the mounting bracket so that the cage is positioned adjacent to the front sprocket. The cage has a chain-receiving slot, through which a bicycle chain passes. The chain device further includes an actuator, which is configured to move the cage in accordance with a movement of a chain line extending between the front sprocket and a rear sprocket assembly.

In a sixteenth aspect, the invention is a bicycle chain device that includes a mounting bracket, which is configured to be affixed to a bicycle that has a solitary bicycle front sprocket having a rotational center axis. The front sprocket is rotatable together with a crank arm and is movable with respect to the crank arm in a direction parallel to the rotational center axis. The chain device further includes a cage movably mounted to the mounting bracket so that the cage is positioned adjacent to the front sprocket. The cage includes a chain-receiving slot, through which a bicycle chain passes. The cage is configured to be moved in accordance with a position of the front sprocket in a direction extending along the rotational center axis.

In a seventeenth aspect, in the bicycle chain device according to the sixteenth aspect, the cage includes at least one contact member to contact the front sprocket, and wherein contact between the contact member and the front sprocket causes the cage to be moved in correspondence with the front sprocket.

In an eighteenth aspect, the invention is a bicycle chain device that includes a mounting bracket, which is configured to be affixed to a bicycle that has a solitary bicycle front sprocket having a rotational center axis, and a cage movably mounted to the mounting bracket so that the cage is positioned adjacent to the front sprocket. The cage has a chain-receiving slot, through which a bicycle chain passes. The chain device further includes an actuator, which is configured to pivot the cage about a single pivot axis that is stationary with respect to the mounting bracket.

Other advantages and features of the present invention will become apparent to those skilled in the art from the following detailed description and the drawings.

DESCRIPTION OF THE EMBODIMENTS

Figure 1:
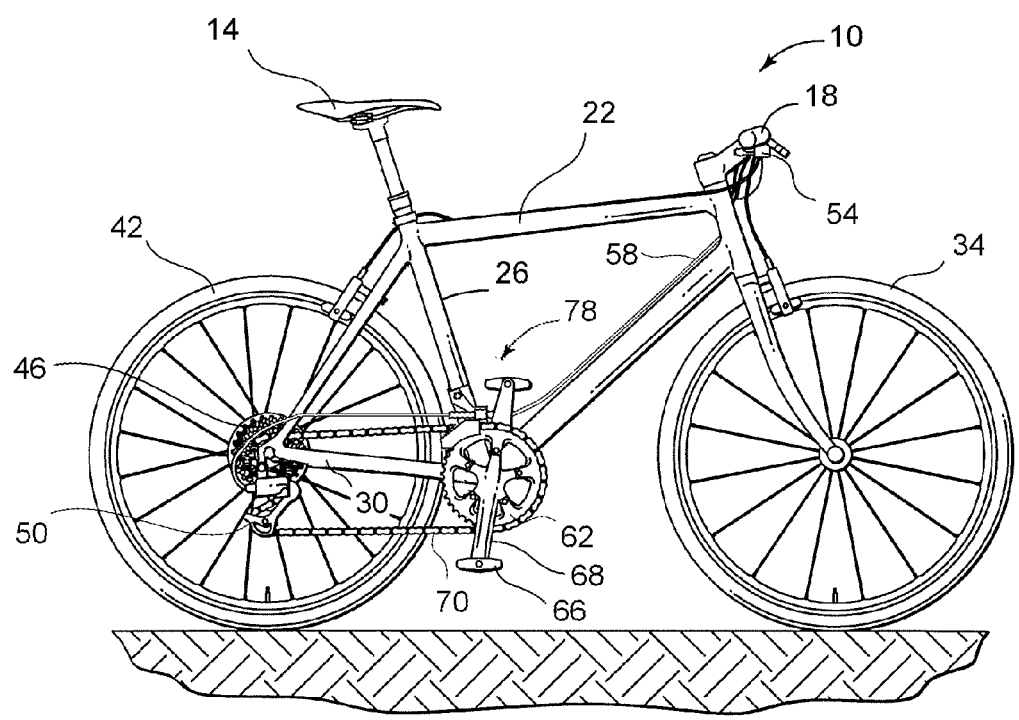
FIG. 1 is a side view of a bicycle that includes a chain device according to a first embodiment of the invention.

FIG. 1 shows a bicycle 10 that includes a seat 14, handlebars 18, a frame 22, a seat tube 26, a chainstay 30, a front wheel 34, a rear wheel 42, a rear sprocket assembly 46, a rear derailleur 50, an operating device 54, a mechanical operation cable 58, which is controlled by the operating device 54, a front sprocket 62, a pedal 66, a crank arm 68, a chain 70, and a chain device 78. The operating device is, for example, a known device for pulling and releasing the mechanical operation cable 58. The chain device 78 prevents the chain 70 from falling off the front sprocket 62. The mechanical operation cable 58 extends between the operating device 54 and the rear derailleur 50, so that a rider can manipulate the operating device 54 to change the gear ratio, in a well-known manner. The front sprocket 62 is the only front sprocket on the bicycle 10; that is, the front sprocket 62 is a solitary front sprocket. Other unnumbered parts of the bicycle 10 are well-known and will not be discussed or illustrated in detail.

For reference purposes, the front sprocket 62 has a rotational center axis 90 (see FIGS. 3 and 4), and a center plane 94 (see FIGS. 4, 5, 6 and 8) passes through the center of the frame 22 and is perpendicular to the rotational axis of the rear wheel 42 and the rotational center axis 90 of the front sprocket 62.

In the embodiment of FIGS. 1-5, the front sprocket 62 is a floating front sprocket. That is, the front sprocket 62 is free to move, within a limited range, in the axial direction of the rotational center axis 90 while the front sprocket 62 is being driven. When the front sprocket 62 is permitted to float, the front sprocket 62 tends to move towards a position aligned with the position of the rear derailleur 50, which makes the path of the chain 70 more efficient. Thus, when the rear derailleur 50 moves the chain 70 to a different gear on the rear sprocket assembly 46, the front sprocket 62 tends to move axially to follow the rear derailleur. Floating front sprockets are known in the art; thus, the mechanical elements that permit the front sprocket 62 to float are not described herein.

Referring to FIGS. 1-5, in the first embodiment, a base member 102 is fixed to the seat tube 26, and a mounting bracket 106 of the chain device 78 is attached to the base member 102. An elongated opening 110 is formed in the mounting bracket 106, and a mounting bolt 114 passes through the elongated opening 110 to fix the chain device 78 to the base member 102 and the seat tube 26. The elongated opening 110 allows the position of the mounting bracket 106 with respect to the front sprocket 62 to be adjusted.

The bicycle chain device 78 includes the mounting bracket 106, which is configured to be affixed to the bicycle 10 that has the solitary bicycle front sprocket 62. The chain device 78 further includes a cage 126 movably mounted to the mounting bracket 106 so that the cage 126 is positioned adjacent to the front sprocket 62. The cage 126 has a chain-receiving slot 130, through which the bicycle chain 70 passes. In the illustrated embodiment of FIGS. 1-5, the chain device 78 further includes an actuator 134, which is configured to move the cage 126 in accordance with a shifting operation of the bicycle rear derailleur 50.

Figure 3:
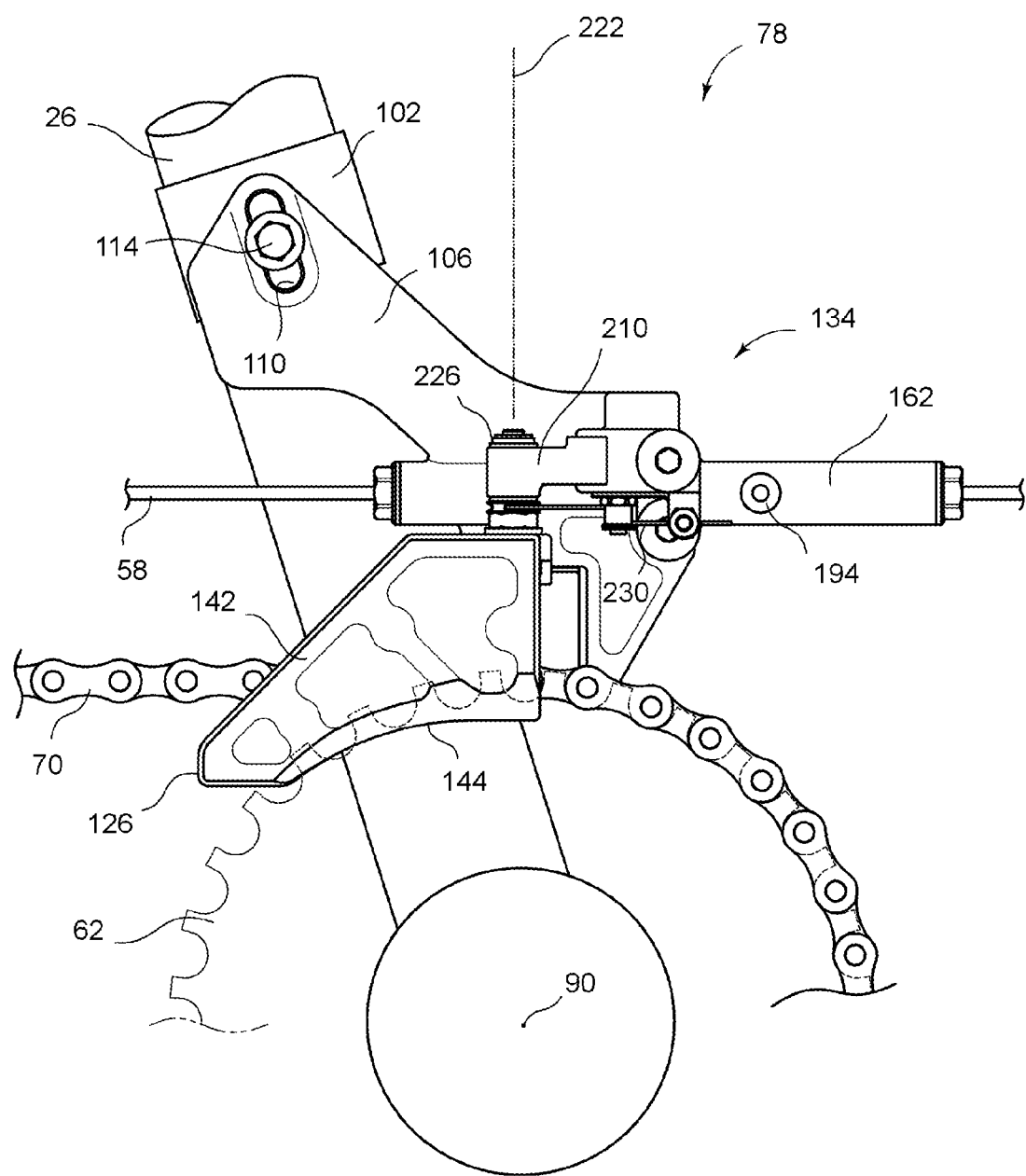
FIG. 3 is a side view of the chain device of FIG. 2.
Figure 4:
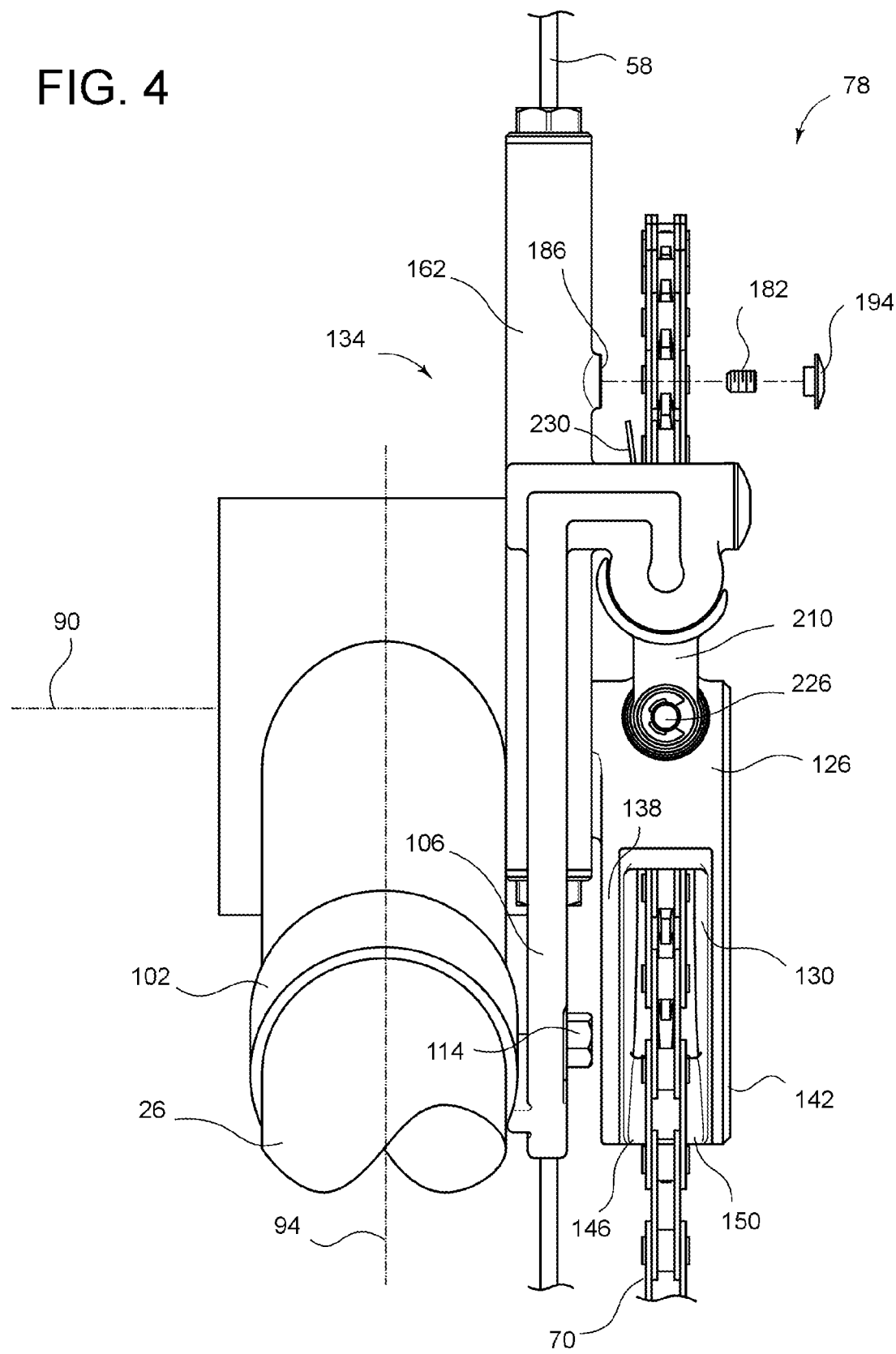
FIG. 4 is a top plan view of the chain device of FIG. 2.

Referring to FIGS. 3 and 4, in the first illustrated embodiment, the cage 126 has a first plate 138 and a second plate 142 forming the chain-receiving slot 130, and the cage 126 is positioned such that bottom edges 144 of the first and second plates 138, 142 at least partly overlap with the front sprocket 62 as viewed in a direction parallel to the rotational center axis 90 (See FIG. 3) in a state in which the mounting bracket 106 is affixed to the bicycle 10. In other words, as shown in FIG. 3, at least a bottom part of the cage 126 is located within an axial projection of the front sprocket 62.

Figure 5:
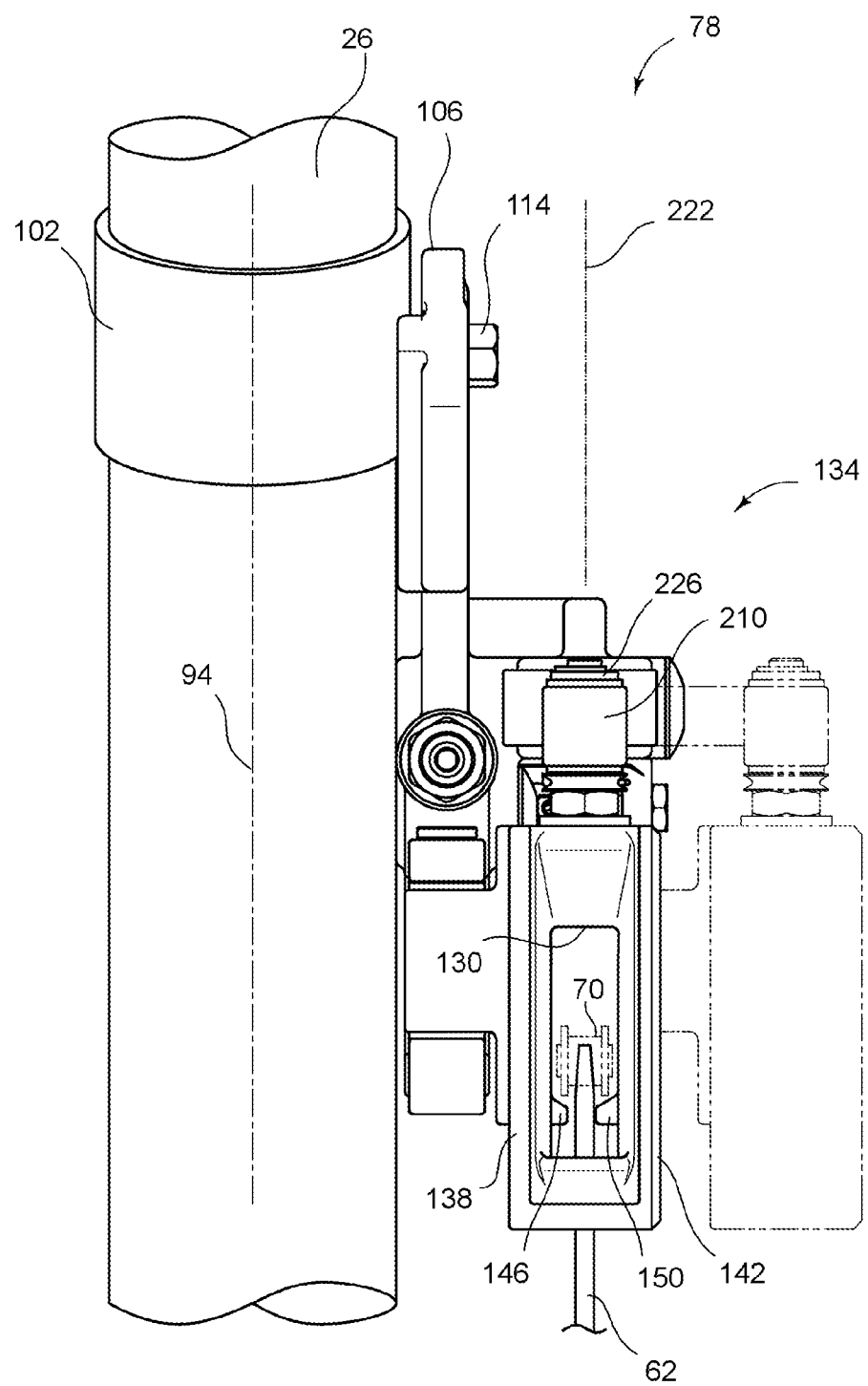
FIG. 5 is a rear view of the chain device of FIG. 2.

In the embodiment of FIGS. 1-5, the cage 126 includes a pair of contact members 146, 150, which prevent misalignment between the cage 126 and the front sprocket 62. As shown in FIG. 5, an inner contact member 146 projects toward the center of the chain slot from the inner surface of the first plate 138, and an outer contact member 150 projects toward the center of the chain slot 130 from the inner surface of the second plate 142. The contact members 146, 150 prevent misalignment between the cage 126 and the front sprocket 62 and thus prevent the chain 70 from rubbing against the inner surfaces of the cage 126, as shown in FIG. 5.

Figure 2:
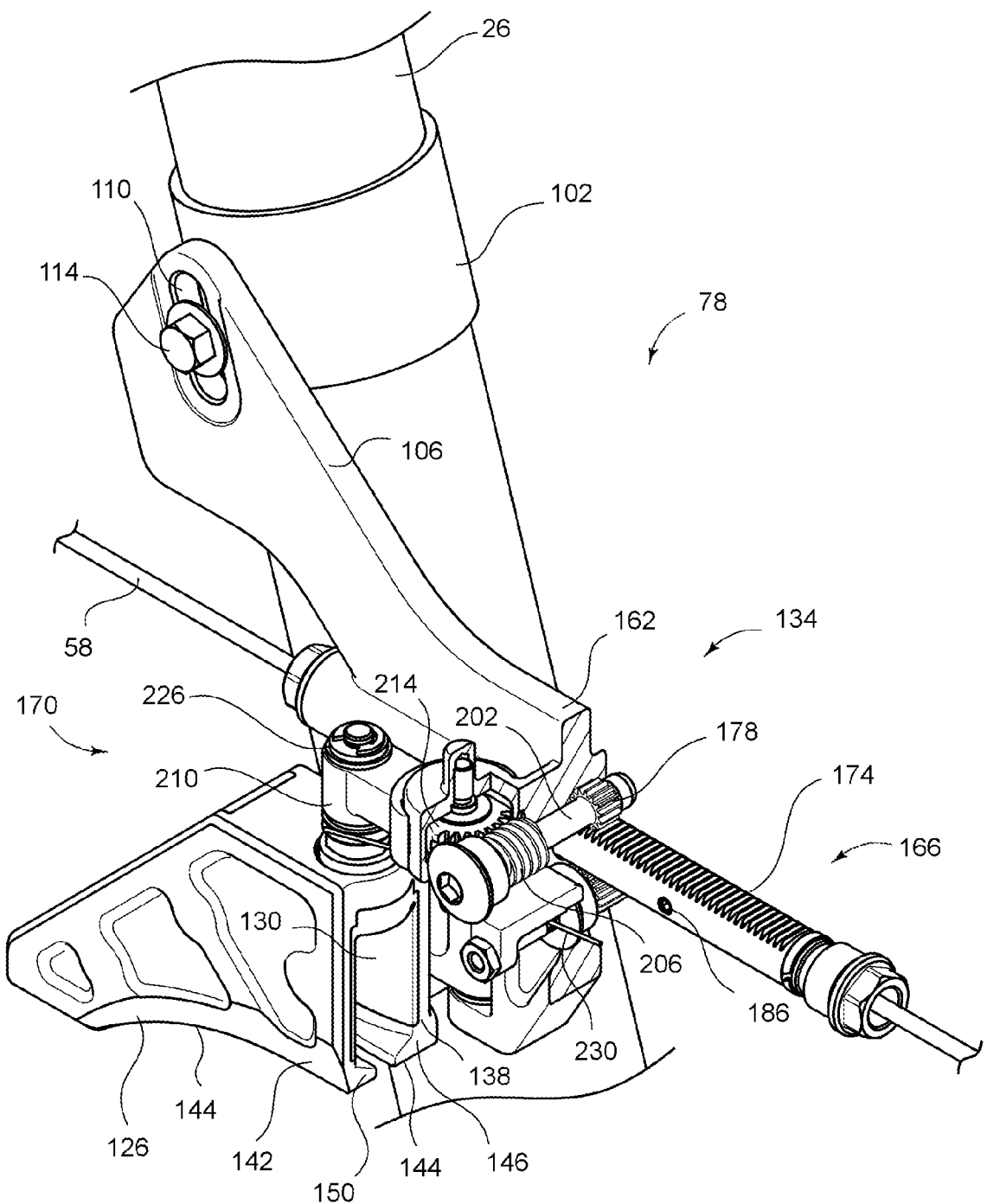
FIG. 2 is a perspective view of the chain device of the first embodiment with parts cut away.

In FIG. 2, parts of a housing 162 of the chain device 78 have been cut away for purposes of illustration. In the embodiment of FIG. 2, the actuator 134 is a mechanical actuator. As shown in FIG. 2, the actuator 134 is configured to be operatively coupled to the mechanical operation cable 58 that operates the bicycle rear derailleur 50.

Referring to the illustrated embodiment of FIG. 2, the actuator 134 includes a first actuating member 166 configured to be coupled to the mechanical operation cable 58 and a second actuating member 170 operatively connected to the first actuating member 166 and the cage 126, so that movement of the mechanical operation cable 58 is transmitted to the second actuating member 170 via the first actuating member 166 to move the cage 136.

In the embodiment of FIG. 2, the rack 174 is fixed to the mechanical operation cable 58, and the mechanical operation cable 58 is received by a longitudinal passage in the rack 174. As best shown in FIG. 4, a set screw 182 is threaded into a corresponding threaded hole 186 in the rack 174. An access port 190 is formed in the housing 162 (See FIG. 4), through which the set screw 182 can be engaged with a suitable tool (not illustrated). When tightened, the set screw 182 fixes the rack 174 to the mechanical operation cable 58. The longitudinal position of the mechanical operation cable 58 with respect to the rack 174 is set before the set screw 182 is tightened and can be adjusted by loosening the set screw 182 with the tool. A set screw cover 194 can be used to cover the access port 190. When the mechanical operation cable 58 is moved longitudinally by the operating device 54 in one direction or by a return spring of the rear derailleur 50 in an opposite direction, for example, the rack 174 is moved correspondingly.

In the illustrated embodiment of FIG. 2, the pinion 178 engages the teeth of the rack 174 and is thus rotated in correspondence with longitudinal motion of the mechanical operation cable 58. Rotation of the pinion 178 rotates a pinion shaft 202, which rotates a worm gear 206. The worm gear 206 is fixed on the pinion shaft 202 coaxially with the pinion 178, as shown.

Further, in the illustrated embodiment of FIG. 2, the actuator 134 includes a linkage 210 configured to be movably coupled to the cage 126 so that the cage 126 is movable with respect to the mounting bracket 106. Thus, in this embodiment, the worm gear 206 engages and rotates a pivot gear 214, which is fixed to the linkage 210, when the pinion 178 is rotated by the mechanical operation cable 58. In the illustrated embodiment, the pivot gear 214 rotates about an axis that is perpendicular to the axis of the worm gear 206, as shown in FIG. 2. Rotation of the pivot gear 214 pivots the linkage 210 about the axis of the pivot gear 214, which causes a distal end of the linkage 210 to move toward or away from the mounting bracket 106. Thus, longitudinal movement of the mechanical operation cable 58 is converted, by the actuator 134, to movement of the cage 126 toward and away from the mounting bracket 106. Thus, the cage 126 is configured to move in a direction extending along the rotational center axis 90 of the front sprocket 62. Although any of several known types of actuators can be suitably employed to transmit movement of the mechanical operation cable 58 to the cage, in the illustrated embodiment of FIG. 2, the first actuating member 166 includes the rack 174, and the second actuating member 170 includes the pinion 178, the worm gear 206, the pivot gear 214, and the linkage 210. Thus, the first actuating member includes one of a rack and pinion and the second actuating member includes the other of the rack and pinion.

The actuator 134 is preferably constructed such that, when the mechanical operation cable 58 is pulled toward the operating device 54, the cage is moved toward the mounting bracket 106. In other words, in a preferred embodiment, the cage 126 is configured to be movable with respect to the mounting bracket 106 between a retracted position and an extended position that is further from the seat tube 26 than the retracted position in a state where the mounting bracket 106 is mounted to the seat tube 26. The cage 126 is moved toward the retracted position as the mechanical operation cable 58 is pulled toward the operating device 54 that controls the mechanical operation cable 58. The retracted position is shown in solid lines in FIG. 5, and the extended position is shown in broken lines in FIG. 5.

In the illustrated embodiment of FIGS. 1-5, the cage 126 is pivotal about a pivot axis 222 that is perpendicular to the rotational center axis 90 of the front sprocket 62. That is, the cage 126 is pivotally attached to the distal end of the linkage 210 about a linkage pivot joint 226, which defines the pivot axis 222 that is perpendicular to the rotational center axis 90 of the front sprocket 62. The linkage pivot joint 226 permits the cage 126 to pivot in response to changes in the location of the path of the chain 70.

If the bicycle 10 is operating with the rear derailleur 50 in the outermost position, the cage 126 will be moved to the extended position by the actuator 134, as shown in broken lines in FIG. 5. When a rider manipulates the operating device 54 to shift the rear derailleur 50 to the innermost gear, the operating device 54 pulls the mechanical operation cable 58, and the rack 174 is moved toward the front of the bicycle 10, or rightward in the view of FIG. 3. In response to the movement of the mechanical operation cable 58, the rear derailleur 50 moves inward, toward the center plane 94, to the retracted position, and the chain 70 follows. When the mechanical operation cable 58 moves longitudinally, the pinion 178 rotates and drives the worm gear 206, which causes the distal end of the linkage 210 to pivot toward the mounting bracket 106. Thus, the cage 126 moves to the retracted position, which is shown in solid lines in FIG. 5. The front sprocket 62 tends to follow the lateral movement of the chain 70 and thus also moves toward the center plane 94 when the rear derailleur moves toward the center plane 94 in a downshifting operation. However, if the axial movement of the front sprocket 62 is sluggish, the outer contact member 150 will contact the outer surface of the front sprocket 62 when the cage 126 moves toward the retracted position and will push the front sprocket 62 axially inward, toward the center plane, to maintain alignment between the cage 126 and the front sprocket 62.

When shifting to a higher gear from a lower gear with the rear derailleur, this operation is reversed, and the cage 126 is moved outward, toward the extended position shown in broken lines in FIG. 5. If the outward axial movement of the front sprocket 62 is sluggish, the inner contact member 146 will push the front sprocket 62 so that the front sprocket 62 is moved axially outward to maintain alignment between the cage 126 and the front sprocket 62. In this manner, the cage 126 can be moved to any number of positions between the fully extended position and the fully retracted position depending on the number of sprockets provided on the rear sprocket assembly 46. The chain device 78 can be provided with a return spring 230 that urges the chain device 78 toward the retracted position; however, even under the force of such a return spring 230, the cage 126 will move only in accordance with the movement of the mechanical operation cable 58.

Figure 6:
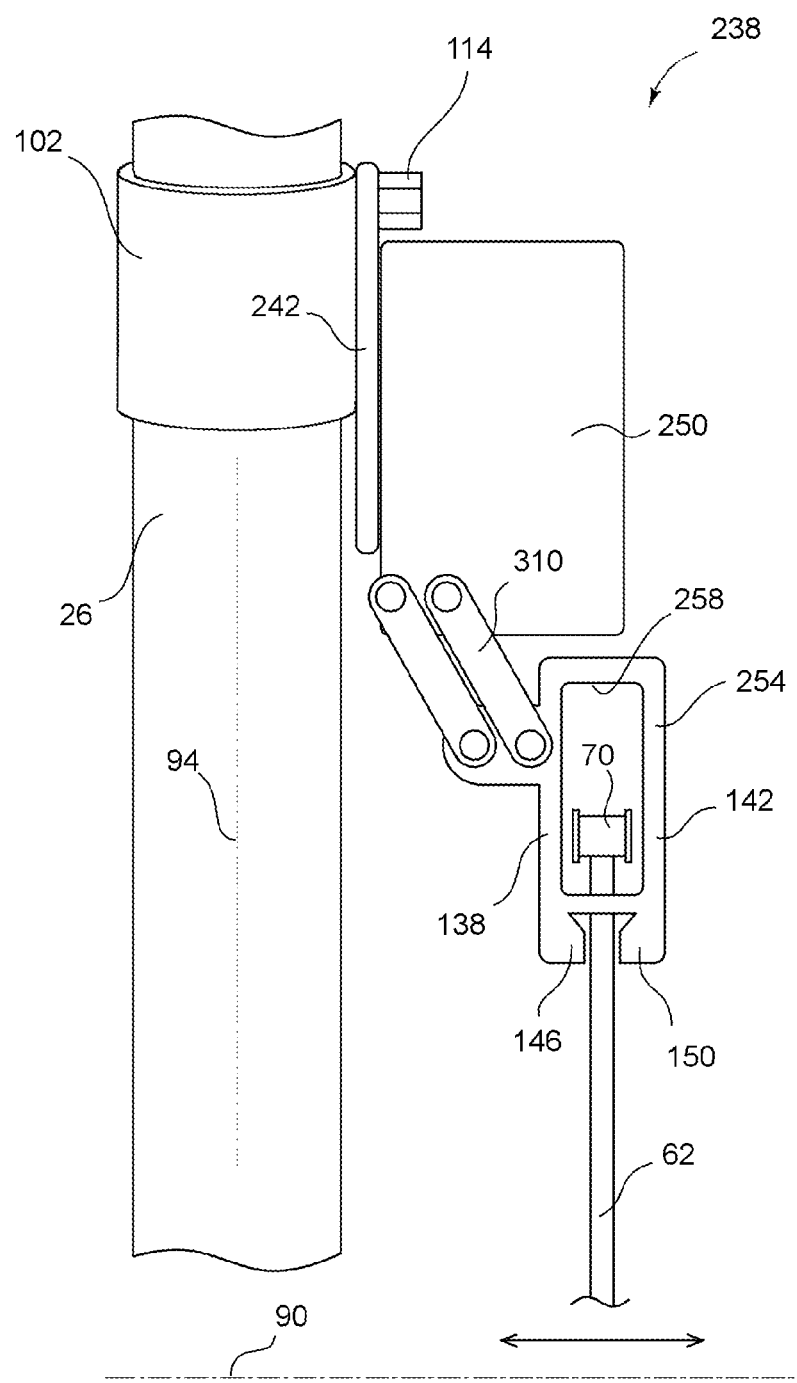
FIG. 6 is a diagrammatic view of a chain device of a second embodiment.
Figure 7:
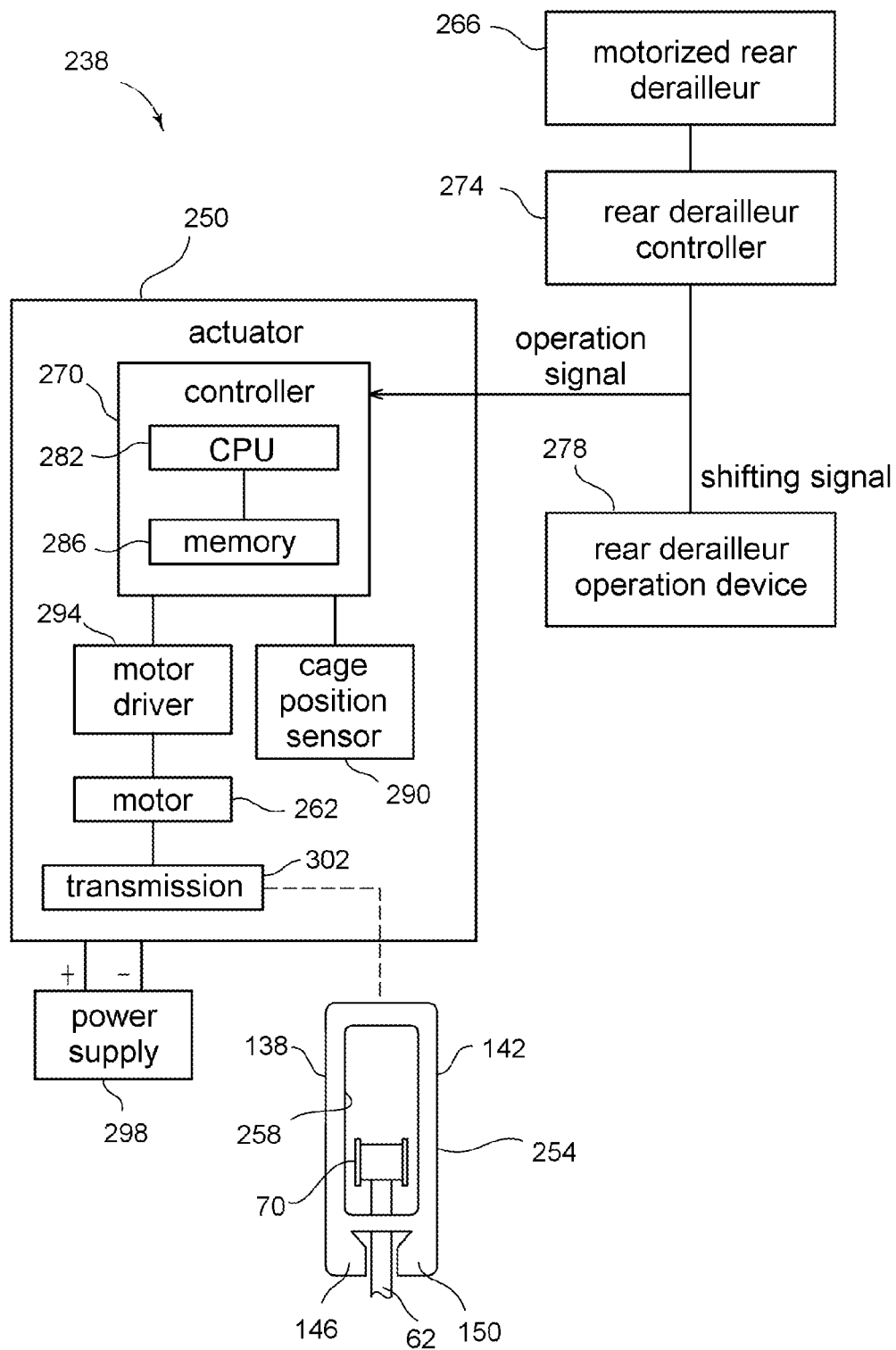
FIG. 7 is a block diagram showing an actuator of the chain device of FIG. 6.

A chain device 238 of a second illustrated embodiment is shown in FIGS. 6 and 7. Reference numbers used to describe parts of one embodiment may be used again herein to refer to parts in a subsequent embodiment where the parts correspond and are the same or similar. Except as described below, the chain device 238 of the second embodiment is the same as that of the first embodiment, and the front sprocket 62 is the same as the front sprocket of the first embodiment. That is, the front sprocket 62 is solitary and floating. In the second embodiment, a chain device 238 includes a mounting bracket 242 and a cage 254. The cage 242 has a chain-receiving slot 258. The chain device 238 of FIGS. 6 and 7 has an actuator 250 that is electromechanical. That is, the actuator 250 includes an electrical motor 262 to move the cage 242 and a controller 270 to move the electrical motor 262 in accordance with an operation signal. The actuator 250 performs the functions performed by the actuator 134 described above in connection with the first embodiment except that the actuator 250 of the second embodiment employs the electrical motor 262 and does not rely on a mechanical operation cable. The chain device 238 of the second embodiment is adapted to be used with a motorized rear derailleur 266. The motorized rear derailleur 266 is controlled by a rear derailleur controller 274. Motorized rear derailleurs and controllers thereof are well-known; therefore, detailed descriptions of the motorized rear derailleur 266 and its controller 274 have been omitted.

When shifting gears, the rider sends a shifting signal to the rear derailleur controller 274 with a rear derailleur operating device 278, either via a wire or wirelessly. For example, the rear derailleur operating device 278 can be located on the handlebars 18. As shown in FIG. 7, the shifting signal is also sent to the actuator 250 as an operation signal. That is, the operation signal is transmitted with a shifting signal to operate the bicycle rear derailleur 266.

Referring to FIG. 7, the actuator 250 of the second embodiment includes the controller 270, which can include, for example, a CPU 282 and a memory 286 for storing programs and data. The actuator 250 can further include a cage position sensor 290, a motor driver 294, the electrical motor 262, a power supply 298, and a transmission 302, which can include, for example, gears (not shown). The power supply 298 can be, for example, a battery.

In the illustrated embodiment of FIG. 6, a parallelogram linkage 310 is driven by the transmission 302 to move the cage 254 between the retracted position and the extended position and to a number of incremental positions between the retracted position and the extended position depending on the number of rear sprockets provided on the rear sprocket assembly 46. However the cage 254 can be moved between the retracted position and the extended position to a number of positions less than the number of rear sprockets, for example. The controller 270 moves the electrical motor 262 such that the cage 254 moves in a shifting direction of the rear derailleur 266 operated by the shifting signal. The shifting direction extends along the rotational center axis 90 of the front sprocket 62. Thus, as in the first embodiment, the actuator 250 moves the cage 254 to correspond with the position of the rear derailleur 266. Based on the operation signal, the controller 270 selects the appropriate position of the cage 254 so that the cage 254 is aligned with the chain 70 and the front sprocket 62. Thus, the cage 254 remains aligned with the chain 70 and the front sprocket 62 and prevents the chain 70 from falling off the front sprocket 62. The number of positions of the cage 254 is stored in the controller 270 according to the number of rear sprockets on the rear sprocket assembly 46.

Although FIG. 6 shows the parallelogram linkage 310 oriented in a manner to swing in an arc that is perpendicular to the center plane 94, the parallelogram linkage 310 can be arranged to swing in other directions as long as the cage 254 moves in a shifting direction of the rear derailleur 266 and along the rotational center axis 90 of the front sprocket. Although the operation signal is based on a shifting signal in this embodiment, the operation signal can be based on other information, for example, as described in further embodiments below.

Figure 8:
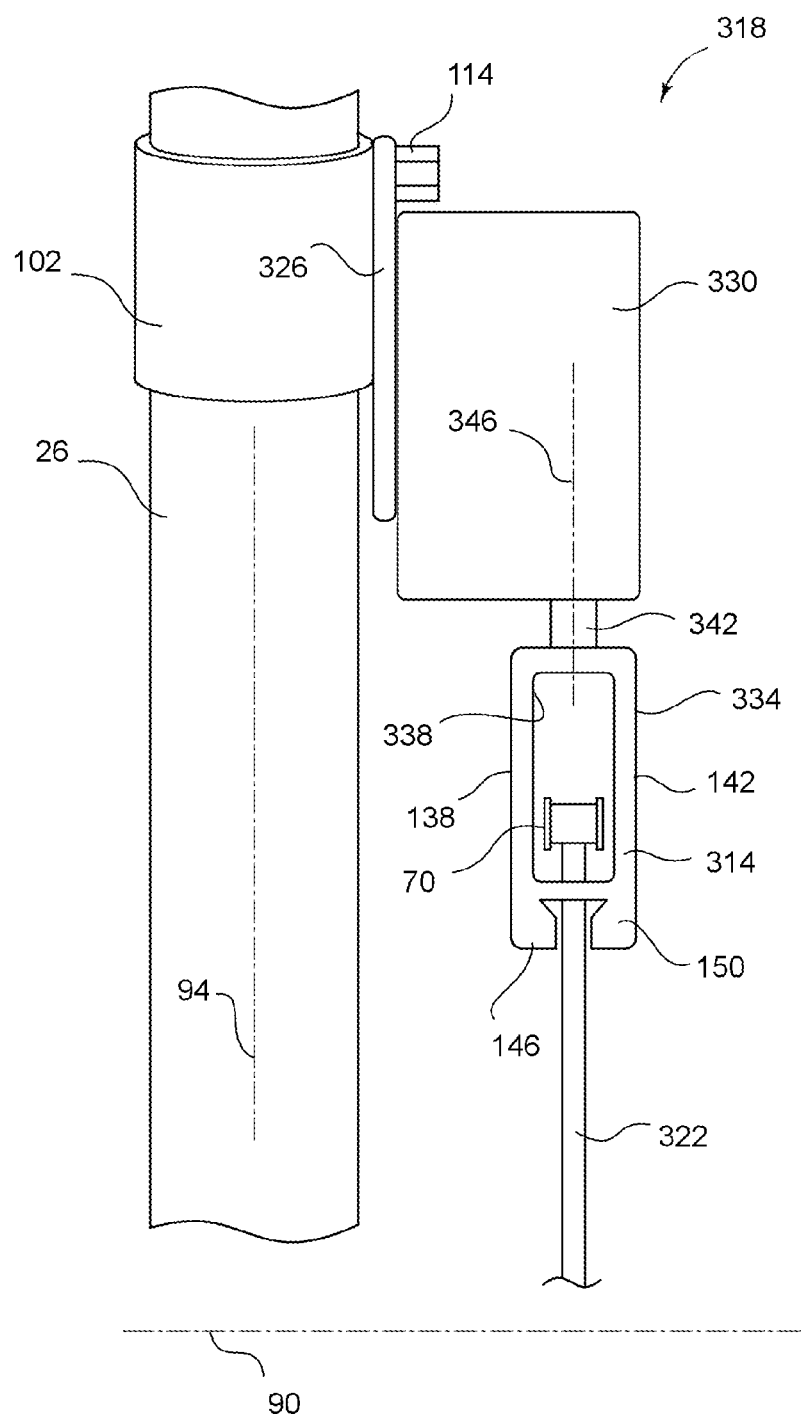
FIG. 8 is a diagrammatic rear view of a chain device of a third embodiment.

FIGS. 8-11 illustrate a chain device 3 of a third embodiment. Except as described below, the third embodiment is the same as the second embodiment. The chain device 318 of the third embodiment is adapted to be used with a non-floating front sprocket 322. That is, unlike the first and second embodiments, the front sprocket 322 is fixed and non-movable in the axial direction with respect to the frame 22. The chain device 318 includes a mounting bracket 326, a cage 334, and an actuator 330 that is electromechanical. The cage 334 includes a chain-receiving slot 338. The actuator 330 of the chain device 318 of FIG. 8 is electromechanical like that of FIG. 6; however, instead of a parallelogram linkage, the actuator 330 of FIG. 6 has a pivot shaft 342 that is pivoted about a single pivot axis 346 by the actuator 330. With reference to FIG. 8, the bicycle chain device 318 includes the mounting bracket 326, which is configured to be affixed to a bicycle 10 that has a solitary bicycle front sprocket 322 having the rotational center axis 90. The cage 334 is movably mounted to the mounting bracket 326 so that the cage 334 is positioned adjacent to the front sprocket 322. The cage 334 has the chain-receiving slot 338, through which the bicycle chain 70 passes. The chain device 318 further includes the actuator 330, which is configured to pivot the cage 334 about a single pivot axis 346 that is stationary with respect to the mounting bracket 326.

The block diagram of FIG. 7 is illustrative not only of the embodiment of FIG. 6 but of the embodiment of FIGS. 8-11. Like the embodiment of FIG. 6, the actuator 330 can be controlled by an operation signal that is transmitted with a shifting signal to operate the bicycle rear derailleur 266. In the embodiment of FIG. 8, the operation signal is based on a shifting signal; however, the operation signal can be based on other information, for example, as described in further embodiments below.

Figure 9:
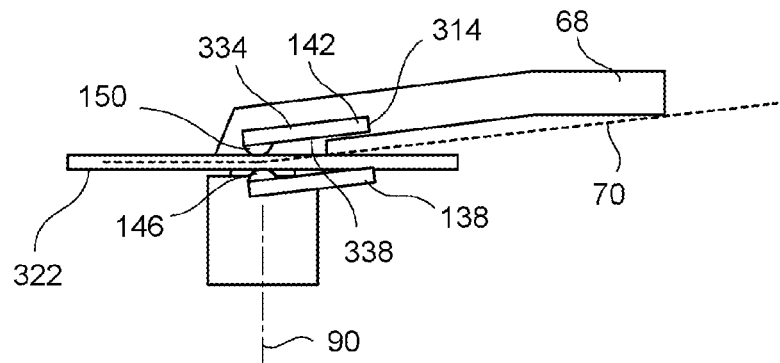
FIGS. 9-11 are diagrammatic top plan views showing various positions of the chain device of FIG. 8.
Figure 10:
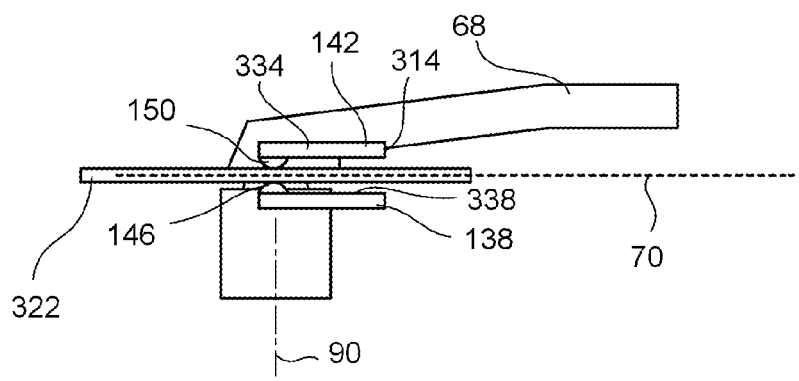
Figure 11:
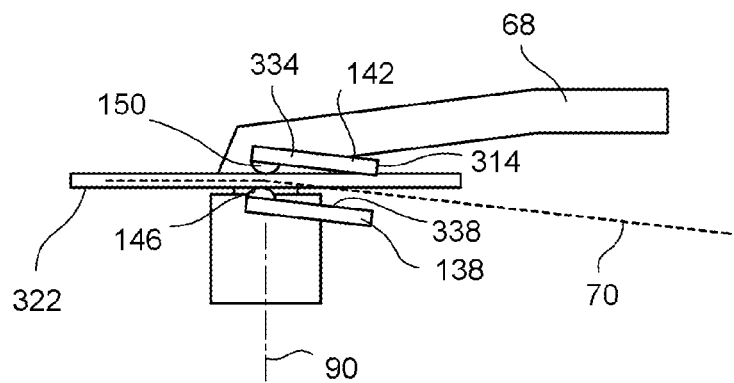

Referring to FIGS. 8-11, the actuator 330 is configured to pivot the cage 334 about the single pivot axis 346 so that a rear end 314 of the cage 334 moves in a shifting direction of the rear derailleur 266, which is operated by the shifting operation, and the shifting direction extends along the rotational center axis 90 of the front sprocket 62. FIG. 9 illustrates a case in which the rear derailleur 266 is shifted to an outermost gear, or a top gear, and the rear end of the cage 334 is moved to an outer position by the actuator 330. FIG. 10 illustrates a case in which the rear derailleur 266 is shifted to a middle gear, or a sprocket that is centrally located on the rear sprocket assembly 46, and the rear end of the cage 334 is moved to a central position by the actuator 330. FIG. 11 illustrates a case in which the rear derailleur 266 is shifted to an innermost gear, or a low gear, and the rear end of the cage 334 is moved to an inner position by the actuator 330. The number of positions of the rear end of the cage 334 depends on the number of sprockets provided on the rear sprocket assembly 46 and can be stored in the actuator 330. However, the number of positions of the rear end of the cage 334 can be less than the number of sprockets of the rear sprocket assembly 46. Thus, the cage 334 remains aligned with the chain 70 and prevents the chain 70 from falling off the sprocket 322.

Although the chain device 318 of the third device employs an actuator 330 that is electromechanical and is responsive to an operation signal, the mechanical actuator 134 of the first embodiment can be modified to pivot the cage 334 about the pivot axis 346 in response to the movement of a mechanical operation cable 58.

Figure 12:
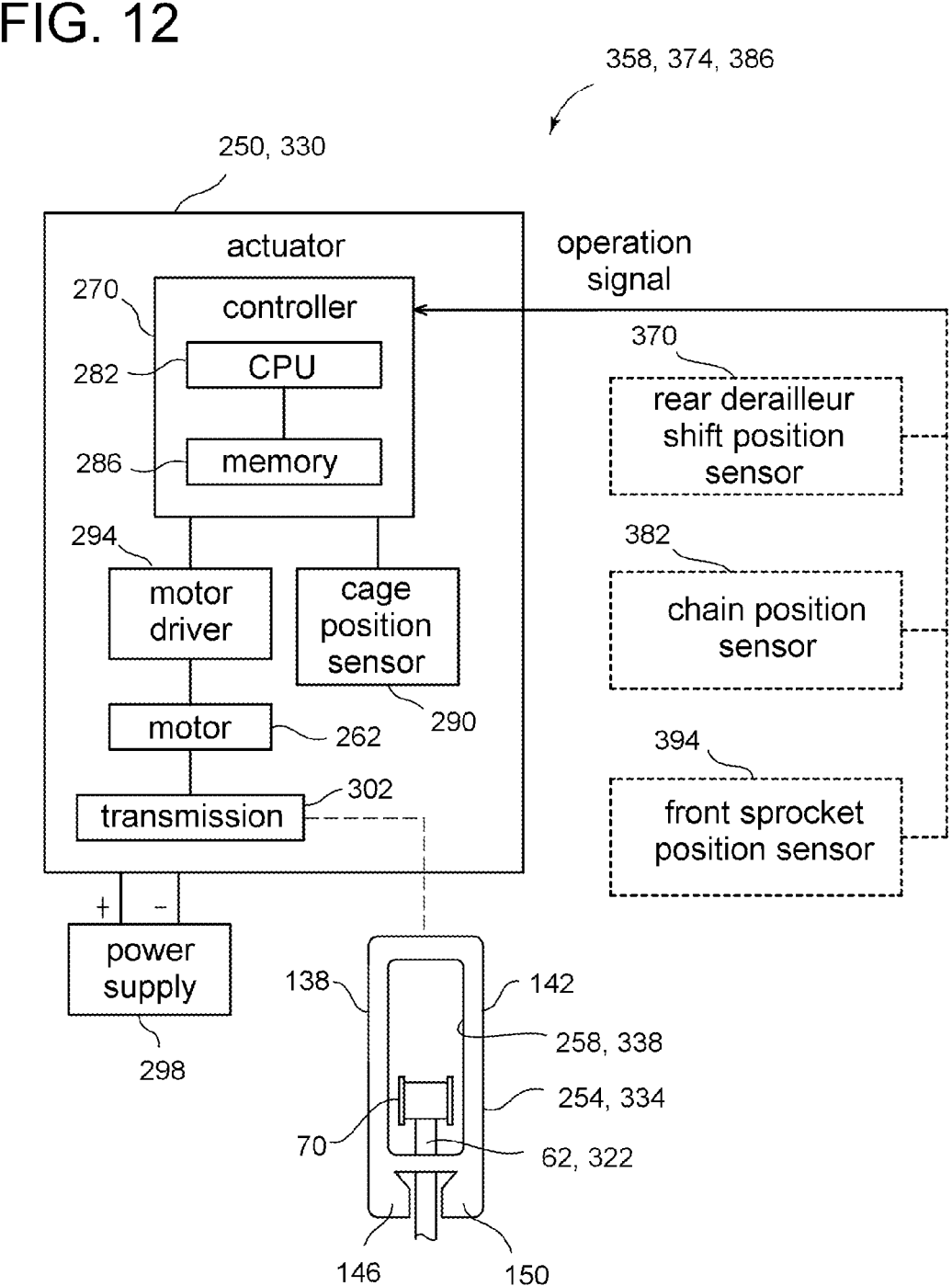
FIG. 12 a block diagram showing actuator of the chain devices of fourth, fifth, and sixth embodiments.

Fourth, fifth and sixth embodiments are described with reference to FIG. 12. In the block diagram of FIG. 12, the blocks illustrated in broken lines are various options that form the fourth, fifth and sixth embodiments, respectively, as described below.

In the fourth embodiment, the chain device 358 is like that of FIG. 6 or 8 and includes the actuator 250, 330 that is electromechanical and can be essentially the same as either of those of the second and third embodiments. The actuator 250, 330 is configured to move a cage 254, 334 in accordance with a position sensed by a rear derailleur shift position sensor 370. In this embodiment, the rear derailleur shift position sensor 370 can be integral with or separate from a mechanically operated rear derailleur 50 or a motorized rear derailleur 266. Referring to FIG. 12, the operation signal can be based on a position signal from the rear derailleur shift position sensor 370. The position signal can be transmitted via a wire or wirelessly. Thus, the position of the cage 254, 334 is based on the position of the rear derailleur 50, 266.

In the fifth embodiment, the chain device 374 is like that of either of FIG. 6 or 8 and includes an actuator 250, 330 that is electromechanical and can be essentially the same as either of those of the second and third embodiments. In the fifth embodiment, the chain device 374 includes the actuator 250, 330, which is configured to move the cage 254, 334 in accordance with a movement of a chain line extending between the front sprocket 62, 322 and a rear sprocket assembly 46. The chain device 374 of this embodiment is adapted to be used with a mechanically operated rear derailleur 50 or a motorized rear derailleur. For example, in this embodiment, the chain device 374 can include a chain position sensor 382 that detects the position of the chain 70. The chain position sensor 382 can include, for example, a proximity sensor mounted on a chain stay 30 for detecting distance between the proximity sensor and the chain 70. The operation signal can be based on a position signal from the chain position sensor 382. The position signal can be transmitted via a wire or wirelessly. Thus, the position of the cage 254, 334 is adjusted in accordance with the position of the chain 70.

A chain device 386 of the sixth embodiment is like that of FIG. 6 and includes an actuator 250 that is electromechanical. In this embodiment, the front sprocket 62 is solitary and floating, and the cage 254 is configured to be moved in accordance with a position of the front sprocket 62 in a direction extending along the rotational center axis 90. The chain device 386 can include, for example, a front sprocket position sensor 394. The front sprocket position sensor 394 can include, for example, a proximity sensor for detecting the axial position of the front sprocket 62. The operation signal can be based on a position signal from the front sprocket position sensor 394. The front sprocket position signal can be transmitted via a wire or wirelessly. Thus, the position of the cage 254 is adjusted in accordance with the position of the front sprocket 62.

Figure 13:
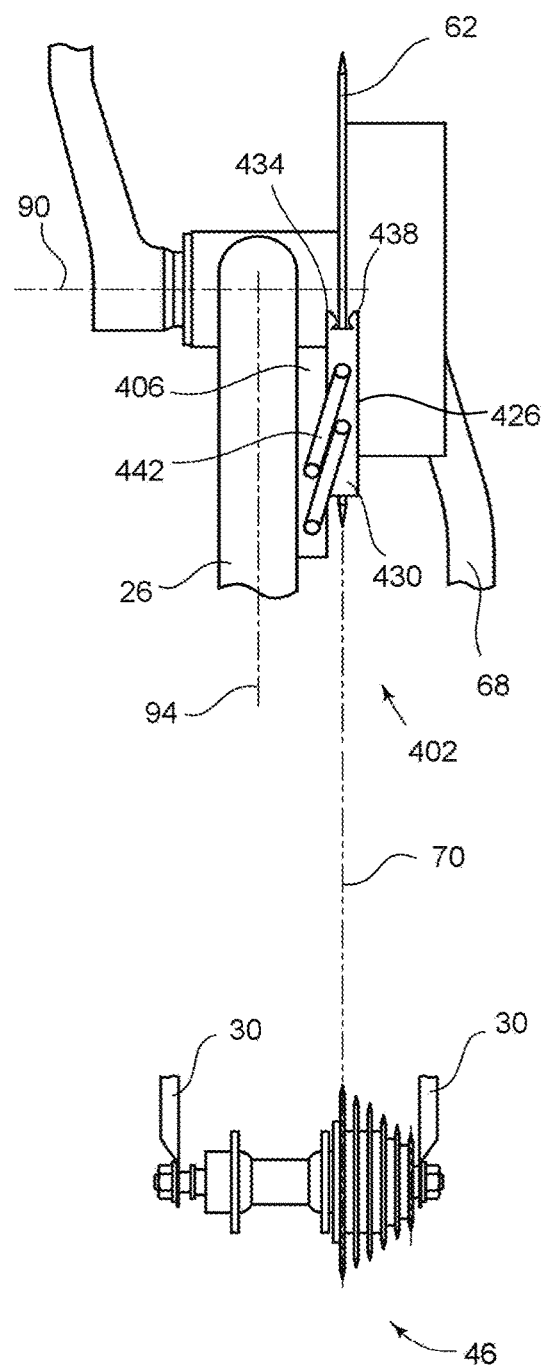
FIG. 13 is a diagrammatic top plan view showing in inner position of a chain device of a seventh embodiment.
Figure 14:
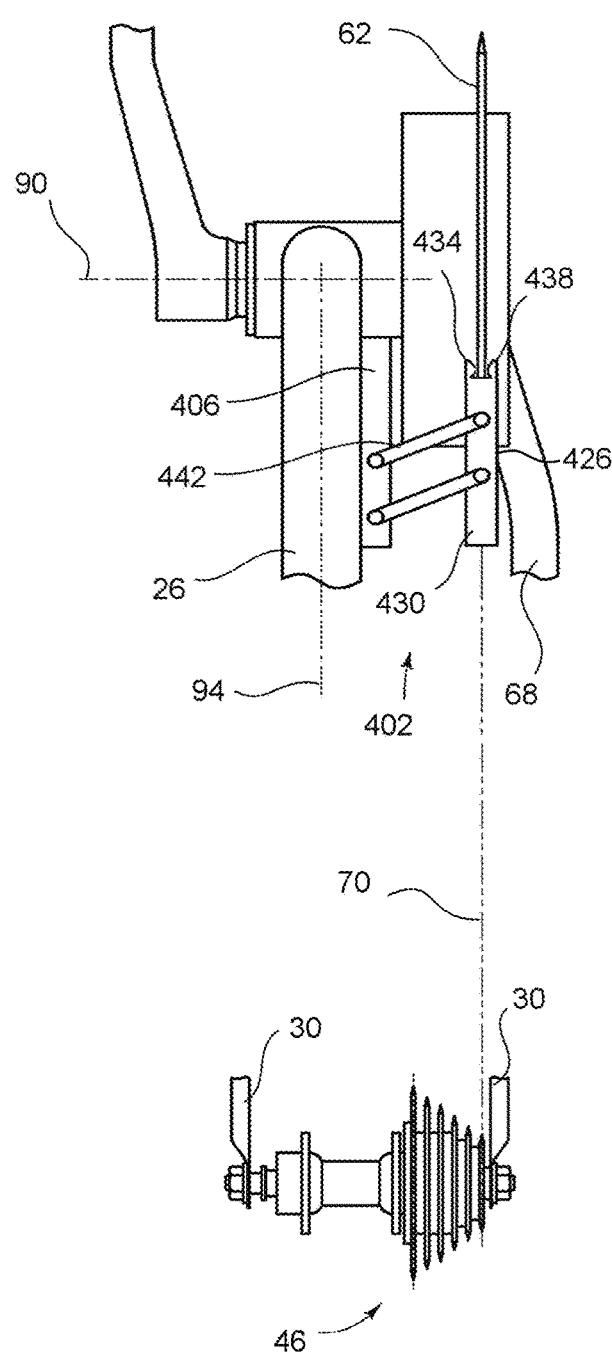
FIG. 14 is a diagrammatic top plan view showing in outer position of a chain device of the chain device of FIG. 13.

The seventh embodiment is illustrated in FIGS. 13 and 14. The seventh embodiment is adapted for use with a solitary floating front sprocket 62 and is like the first embodiment except as described below. In the seventh embodiment, a bicycle chain device 402 includes a mounting bracket 406 configured to be affixed to a bicycle 10 that has a solitary bicycle front sprocket 62 having the rotational center axis 90. The front sprocket 62 is rotatable together with the crank arm 68 and is movable with respect to the crank arm 68 in a direction parallel to the rotational center axis 90. A cage 426 is movably mounted to a mounting bracket 406 so that the cage 426 is positioned adjacent to the front sprocket 62. The cage 426 includes a chain-receiving slot 430, through which a bicycle chain 70 passes. The cage 426 is configured to be moved in accordance with a position of the front sprocket 62 in a direction extending along the rotational center axis 90. The cage 426 includes at least one contact member 434, 438 to contact the front sprocket 62. Contact between the contact member 434, 438 and the front sprocket 62 causes the cage 426 to be moved in correspondence with the front sprocket 62.

In the seventh embodiment of FIGS. 13 and 14, there is no actuator to drive the lateral movement of the cage 426. In this embodiment, the chain device 402 is adapted to be used with a mechanical rear derailleur 50 or a motorized rear derailleur. However, if a mechanically operated rear derailleur 50 is employed, the mechanical operation cable 58 is not coupled to the cage 426. Instead, the cage 426 is free to move, within a limited range, in a direction along the axial direction of the front sprocket 62, and the cage 426 follows the movement of the front sprocket 62 due to the contact members 434, 438. That is, as the front sprocket 62 moves in the axial direction, it will engage one of the contact members 434, 438 and cause the cage 426 to maintain alignment with the front sprocket 62 and the chain 70. Thus, the cage 426 moves in accordance with the position of the front sprocket 62.

In the illustrated embodiment, a linkage 442 formed by pivotal links couples the cage 426 to the mounting bracket 422, which maintains a parallel relationship between the cage 426 and the center plane 94 while permitting the cage 426 to move along the rotational axis 90 of the front sprocket 62. In FIG. 13, the cage 426 and the front sprocket 62 are in an innermost position. In FIG. 14, the cage 426 and the front sprocket 62 are in an outermost position. Although the linkage 442 constrains the cage 426 to swing in a plane that is perpendicular to the center plane 94, the linkage 442 can be arranged to swing in other directions, as long as the cage 426 can move along the rotational axis 90 of the front sprocket 62.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

The invention claimed is:
1. A bicycle chain device comprising:
a mounting bracket configured to be affixed to a bicycle that has a solitary bicycle front sprocket having a rotational center axis, wherein the front sprocket is rotatable together with a crank arm and is movable with respect to the crank arm in a direction parallel to the rotational center axis, and
a cage movably mounted to the mounting bracket so that the cage is positioned adjacent to the front sprocket, wherein the cage includes a chain-receiving slot, through which a bicycle chain passes, wherein the cage is configured to be moved in accordance with a position of the front sprocket in a direction extending along the rotational center axis, and wherein the cage at least partly overlaps with the front sprocket as viewed in a direction parallel to the rotational center axis in a state in which the mounting bracket is affixed to the bicycle.
2. A bicycle chain device comprising:
a mounting bracket configured to be affixed to a bicycle that has a solitary bicycle front sprocket having a rotational center axis, wherein the front sprocket is rotatable together with a crank arm and is movable with respect to the crank arm in a direction parallel to the rotational center axis, and
a cage movably mounted to the mounting bracket so that the cage is positioned adjacent to the front sprocket, wherein the cage includes a chain-receiving slot, through which a bicycle chain passes, and wherein the cage is configured to be moved in accordance with a position of the front sprocket in a direction extending along the rotational center axis, wherein the cage includes at least one contact member to contact the front sprocket, and wherein contact between the contact member and the front sprocket causes the cage to be moved in correspondence with the front sprocket.

3. The bicycle chain device according to claim 1, wherein the cage is configured to be laterally moved in accordance with a position of the front sprocket in a direction extending along the rotational center axis.

4. The bicycle chain device according to claim 1, wherein the cage is configured to be movable with respect to the mounting bracket between a retracted position and an extended position.

5. The bicycle chain device according to claim 1, wherein the cage is configured to swing with respect to the mounting bracket between a retracted position and an extended position.

6. The bicycle chain device according to claim 1, wherein the cage is configured to swing in a plane that is perpendicular to a center plane of the bicycle between a retracted position and an extended position.

7. The bicycle chain device according to claim 1, further includes a linkage configured to be coupled to the cage and the mounting bracket so that the cage is movable with respect to the mounting bracket.

8. The bicycle chain device according to claim 7, wherein the linkage is formed from at least two pivotal links.

9. The bicycle chain device according to claim 7, wherein the linkage is configured to maintain a parallel relationship between the cage and a center plane of the bicycle while permitting the cage to move along the rotational axis of the front sprocket.

10. The bicycle chain device according to claim 7, wherein the linkage is configured to constrain the cage to swing in a plane that is perpendicular to a center plane of the bicycle while permitting the cage to move along the rotational axis of the front sprocket.

11. The bicycle chain device according to claim 7, wherein the linkage is configured to laterally move the cage in accordance with a position of the front sprocket in a direction extending along the rotational center axis.

12. The bicycle chain device according to claim 7, wherein the linkage is configured to move the cage with respect to the mounting bracket between a retracted position and an extended position.

13. The bicycle chain device according to claim 7, wherein the linkage is configured to swing the cage with respect to the mounting bracket between a retracted position and an extended position.

14. The bicycle chain device according to claim 7, wherein the linkage is configured to swing the cage with respect to the mounting bracket in a plane that is perpendicular to a center place of the bicycle between a retracted position and an extended position.

15. A bicycle chain device comprising:
a mounting bracket configured to be affixed to a bicycle that has a solitary bicycle front sprocket having a rotational center axis,
a cage movably mounted to the mounting bracket so that the cage is positioned adjacent to the front sprocket, wherein the cage includes a chain-receiving slot, through which a bicycle chain passes, and wherein the cage at least partly overlaps with the front sprocket as viewed in a direction parallel to the rotational center axis in a state in which the mounting bracket is affixed to the bicycle, and
an actuator, which is configured to move the cage in accordance with a movement of a chain line extending between the front sprocket and a rear sprocket assembly.

16. A bicycle chain device comprising:
a mounting bracket configured to be affixed to a bicycle that has a solitary bicycle front sprocket having a rotational center axis,
a cage movably mounted to the mounting bracket so that the cage is positioned adjacent to the front sprocket, wherein the cage includes chain-receiving slot, though which a bicycle chain passes, and wherein the cage at least partly overlaps with the front sprocket as viewed in a direction parallel to the rotational center axis in a state in which the mounting bracket is affixed to the bicycle, and
an actuator, which is configured to pivot the cage about a single pivot axis that is stationary with respect to the mounting bracket.

* * * * *